US010076811B2

(12) United States Patent
Ozbaysal

(10) Patent No.: US 10,076,811 B2
(45) Date of Patent: Sep. 18, 2018

(54) STRUCTURAL BRAZE REPAIR OF SUPERALLOY COMPONENT

(71) Applicant: Siemens Energy, Inc., Orlando, FL (US)

(72) Inventor: Kazim Ozbaysal, Orlando, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 0 days.

(21) Appl. No.: 14/826,366

(22) Filed: Aug. 14, 2015

(65) Prior Publication Data

US 2015/0343574 A1 Dec. 3, 2015

Related U.S. Application Data

(63) Continuation of application No. PCT/US2014/025354, filed on Mar. 13, 2014, which (Continued)

(51) Int. Cl.

| | |
|---|---|
| ***B23P 6/04*** | (2006.01) |
| ***B23K 1/00*** | (2006.01) |
| ***B23K 35/30*** | (2006.01) |
| ***C22F 1/10*** | (2006.01) |
| ***B23K 31/02*** | (2006.01) |

(Continued)

(52) U.S. Cl.

CPC .......... *B23P 6/045* (2013.01); *B23K 35/0244* (2013.01); *B23K 35/304* (2013.01); *B23K 35/3033* (2013.01); *B32B 15/00* (2013.01); *C22C 19/007* (2013.01); *C22C 19/055* (2013.01); *C22C 19/056* (2013.01); *C22C 19/058* (2013.01); *C22F 1/10* (2013.01); *F01D 5/005* (2013.01); *B23K 1/0018* (2013.01); (Continued)

(58) Field of Classification Search

CPC ...................................................... C22C 19/05

See application file for complete search history.

(56) References Cited

U.S. PATENT DOCUMENTS 4,713,217 A * 12/1987 Stern .................... B23K 35/304 228/262.31
5,066,459 A 11/1991 Beltran et al.
(Continued)

FOREIGN PATENT DOCUMENTS

CN 101316940 A 12/2008
EP 0293695 A1 12/1988
(Continued)

OTHER PUBLICATIONS

M.K. Thomas. "Solidification and Strength Characteristics of Ni—Cr—Ti and Co—Cr—Mo Eutectics". Jan. 1, 1982. Published by Elsevier Science Publishing Co., Inc. (pp. 181-193).
(Continued)

*Primary Examiner* — Jenny R Wu

(57) ABSTRACT

Boron and silicon free braze alloys useful for structural repairs of superalloy gas turbine engine components. The braze alloy composition may contain only elements that are contained in the superalloy material to be repaired, and may have melting temperature ranges as low as 10° C. to facilitate producing a high strength homogenized braze joint during a solution heat treatment of the superalloy substrate material.

11 Claims, 1 Drawing Sheet

Related U.S. Application Data is a continuation-in-part of application No. 13/495,223, filed on Jun. 13, 2012.

(60) Provisional application No. 61/782,260, filed on Mar. 14, 2013, provisional application No. 61/555,113, filed on Nov. 3, 2011.

(51) Int. Cl.

| | |
|---|---|
| ***B23K 1/19*** | (2006.01) |
| ***C22C 19/05*** | (2006.01) |
| ***F01D 5/00*** | (2006.01) |
| ***B23K 35/02*** | (2006.01) |
| ***C22C 19/00*** | (2006.01) |
| ***B32B 15/00*** | (2006.01) |

(52) U.S. Cl.
CPC .... *F05D 2230/80* (2013.01); *F05D 2300/175* (2013.01); *F05D 2300/701* (2013.01)

(56) References Cited

U.S. PATENT DOCUMENTS

| | | | | |
|---|---|---|---|---|
| 5,902,421 | A * | 5/1999 | Christy | B23K 35/304 148/428 |
| 6,027,584 | A * | 2/2000 | Jackson | B23K 35/304 148/427 |
| 6,454,885 | B1 | 9/2002 | Chesnes et al. | |
| 6,464,128 | B1 | 10/2002 | Messelling | |
| 6,520,401 | B1 * | 2/2003 | Miglietti | B23K 1/0018 228/194 |
| 6,530,971 | B1 * | 3/2003 | Cohen | B23K 35/0244 148/24 |
| 6,649,682 | B1 * | 11/2003 | Breton | B05D 5/02 524/404 |
| 6,726,086 | B2 | 4/2004 | Phillip | |
| 7,293,688 | B2 | 11/2007 | Ozbaysal | |
| 7,328,832 | B2 | 2/2008 | Ozbaysal | |
| 7,335,427 | B2 | 2/2008 | Sathian | |
| 7,363,707 | B2 | 4/2008 | Powers | |
| 7,434,720 | B2 | 10/2008 | Ozbaysal | |
| 7,461,772 | B2 | 12/2008 | Ozbaysal | |
| 7,506,793 | B2 | 3/2009 | Sathian | |
| 7,748,601 | B2 | 7/2010 | Ozbaysal | |
| 7,867,628 | B2 | 1/2011 | Ozbaysal | |
| 8,087,565 | B2 | 1/2012 | Kottilingam et al. | |
| 8,356,409 | B2 | 1/2013 | Perret | |
| 8,640,942 | B1 | 2/2014 | Ozbaysal et al. | |
| 2003/0136811 | A1 | 7/2003 | Philip | |
| 2005/0035085 | A1 * | 2/2005 | Stowell | B08B 7/0035 216/76 |
| 2005/0281704 | A1 | 12/2005 | Srinivasan | |
| 2009/0140030 | A1 | 6/2009 | Amancherla et al. | |
| 2009/0159645 | A1 | 6/2009 | Cretegny et al. | |
| 2009/0283572 | A1 | 11/2009 | Volek | |
| 2010/0038412 | A1 * | 2/2010 | Huang | B23K 35/3033 228/262.9 |
| 2010/0059573 | A1 | 3/2010 | Kottilingam et al. | |
| 2011/0168679 | A1 | 7/2011 | Qi et al. | |
| 2013/0136868 | A1 * | 5/2013 | Bruck | B05D 3/06 427/554 |
| 2013/0302647 | A1 | 11/2013 | Ozbaysal et al. | |

FOREIGN PATENT DOCUMENTS

| | | | | |
|---|---|---|---|---|
| EP | 1226896 | A2 | 7/2002 | |
| GB | 1299983 | A * | 12/1972 | B23K 35/004 |
| JP | S64053797 | A | 3/1989 | |
| JP | H02251394 | A | 10/1990 | |
| JP | H06501981 | A | 3/1994 | |
| JP | H04254544 | A | 9/1995 | |
| JP | 2006341282 | A | 12/2006 | |
| JP | 2009107020 | A | 5/2009 | |
| JP | 2011131276 | A | 7/2011 | |
| JP | 2012030239 | A | 2/2012 | |
| WO | 2013067341 | A2 | 5/2013 | |
| WO | 2014021968 | A2 | 2/2014 | |

OTHER PUBLICATIONS

Warren Miglietti, High Strength, Ductile Braze Repairs for Stationary Gas Turbine Components, Part 2, ASME Conference Proceedings, ASME Turbo Expo 2009: Power for Land, Sea, and Air (GT2009), Jun. 8-12, 2009, Orlando, Florida, USA.

Xiao Huang, et al., Wide Gap Braze Repair of Gas Turbine Blades and Vanes—A Review, Journal of Engineering for Gas Turbines and Power, vol. 134, Jan. 2012, pp. 010801-1 thru 010801-17.

* cited by examiner

STRUCTURAL BRAZE REPAIR OF SUPERALLOY COMPONENT

This application in a continuation of and claims benefit of the 13 Mar. 2014 filing date of International Application No. PCT/US2014/025354, which in turn claims benefit of the 14 Mar. 2013 filing date of U.S. Provisional Patent Application No. 61/782,260. This application is a continuation-in-part of U.S. patent application Ser. No. 13/495,223 filed 13 Jun. 2012, which in turn claimed benefit of the 3 Nov. 2011 filing date of U.S. Provisional Patent Application No. 61/555,113. All applications are incorporated herein by reference.

FIELD OF THE INVENTION

This invention relates generally to the field of materials technology, and more particularly to the repair of superalloy materials with a brazing process.

BACKGROUND OF THE INVENTION

It is recognized that the repair of superalloy materials is made difficult due to their susceptibility to weld solidification cracking and strain age cracking. The term "superalloy" is used herein as it is commonly used in the art; i.e., a highly corrosion and oxidation resistant alloy that exhibits excellent mechanical strength and resistance to creep at high temperatures. (http://en.wikipedia.org/wiki/Superalloy) Superalloys typically include a high nickel or cobalt content. Examples of superalloys include alloys sold under the trademarks and brand names Hastelloy, Inconel alloys (e.g. IN 738, IN 792, IN 939), Rene alloys (e.g. Rene N5, Rene 80, Rene 142), Haynes alloys, Mar M, CM 247, CM 247 LC, C263, 718, X-750, ECY 768, 282, X45, PWA 1483 and CMSX (e.g. CMSX-4) single crystal alloys.

Brazing processes are used to repair superalloy materials in some applications. While a braze joint is generally understood to be mechanically weaker than a weld joint and to have a lower acceptable operating temperature due to the relatively low melting temperature of the braze material, braze repairs may be acceptable in certain lower stress and/or lower temperature applications.

Typical braze materials using boron or silicon as the melting point depressant material are of limited value with superalloy substrate materials because they create deleterious phases which reduce the ductility of the joint and repaired region. Boron and silicon free braze alloys incorporating hafnium and/or zirconium have been developed for which mechanical properties of up to 80% of the base superalloy properties are claimed. However, such materials tend to form carbides at the braze joint. Thus, further improvements in the brazing of superalloy materials are desired.

BRIEF DESCRIPTION OF THE DRAWINGS

The invention is explained in the following description in view of the drawings that show.

DETAILED DESCRIPTION OF THE INVENTION

Figure 1:
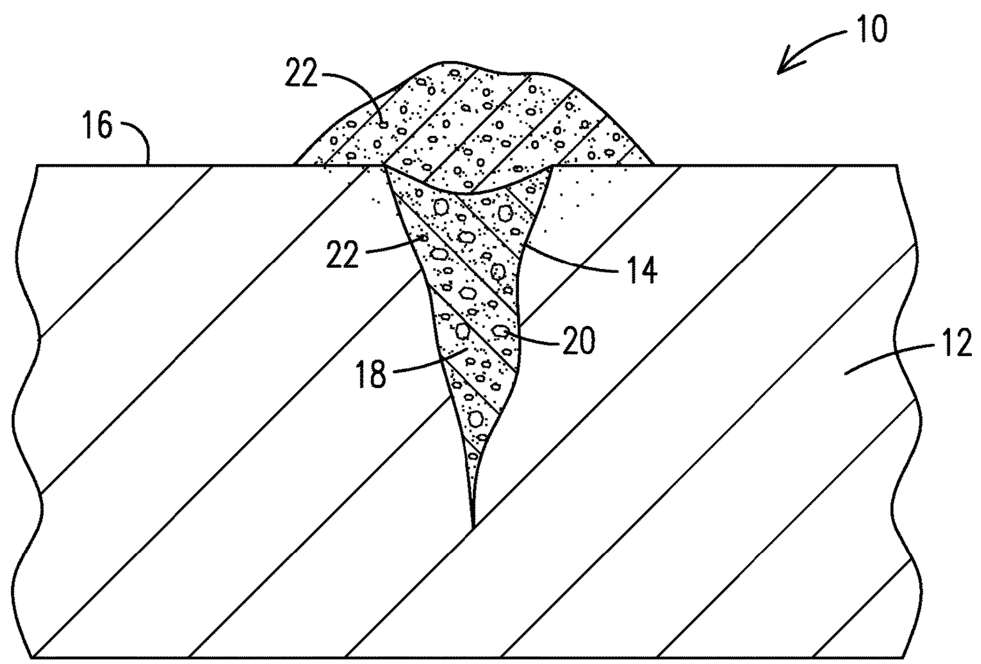
FIG. 1 is a side sectional view of a gas turbine vane wherein a large gap discontinuity is being repaired by brazing.

The present inventor has developed several boron and silicon free braze alloys utilizing titanium as a melting point depressant material, including those disclosed in co-pending U.S. patent application Ser. No. 13/467,402 filed 9 May 2012 and Ser. No. 13/495,223 filed 13 Jun. 2012. Additional boron and silicon free braze alloys particularly useful for the repair of superalloy substrate materials are disclosed herein, including alloys that advantageously have a reduced melting temperature range when compared to prior art hafnium-based braze alloys. Embodiments of the disclosed braze compositions are selected to include only elements that are present in superalloys to be repaired so that homogenization of the braze joint does not introduce any different element into the superalloy material matrix. The present alloys provide brazed joints having mechanical properties sufficiently close to (e.g. more than 80% of) the repaired substrate material properties such that the repair can be considered a structural repair and can be used in relatively high stressed regions of the component.

The present inventor has developed ternary and multi-component braze alloys that exhibit respective melting temperature ranges (also called a freezing temperature ranges in the art) that are as low as no more than 10° C., or in other embodiments no more than 15° C., or no more than 20° C. or no more than 50° C. The term "melting temperature range" as used herein means the difference between the liquidus temperature (100% of the material is liquid) and the solidus temperature (100% of the material is solid). Typical known hafnium-based braze alloys exhibit substantially wider melting temperature ranges—see for example Table 2 of United States Patent Application Publication No. US 2009/0159645 A1, which discloses alloys having melting temperature ranges no lower than 70° C. (126° F.) to as much as 176° C. (317° F.). The present inventor has found that the narrow melting temperature ranges of his alloys facilitate component repair when using the alloys to braze during a solution heat treatment of a superalloy substrate. A narrow melting temperature range provides improved control of the fluidity of the braze material, resulting in more complete venting of solvents, water and organics prior to liquidity of the braze material, a reduced tendency to entrap vented gas within the braze material, improved penetration of substrate cracks and spaces between fill alloy powder particles, and less erosion of the substrate material due to a reduced time of liquidity.

Braze alloys are disclosed herein that are particularly useful for repairing superalloys, including Rene 80 superalloy material, for example when repairing a gas turbine engine blade or vane that has been found to have service-induced cracks on its platform or airfoil section. Rene 80 components present a particular challenge because they may be solution heat treated at 1,215° C., which is lower than some other alloys, such as Alloy 247 components which may be solution heat treated at 1,235° C. Alloys disclosed below may be formulated to have liquidus and solidus temperatures and melting temperature ranges that can be tailored to work cooperatively with a solution heat treatment temperature regiment for the particular superalloy material of the component to accomplish a braze and to fuse and to homogenization the braze joint during solution heat treatment. Such braze materials may be selected to have melting temperature ranges inclusive of or below the solution heat treating temperature (i.e. the peak hold temperature used during the regiment) for particular superalloy substrate materials of interest. The homogenization and solidification of the braze joint advantageously does not introduce any new elemental constituent into the superalloy substrate material that was not already present in that material.

A ternary alloy for such applications may have compositions within the following ranges (all compositions disclosed herein are in units of wt. %):

Cr 15-25%;
Ti 15-25%;
balance Ni.

Particular braze alloys within this group may have the following compositions: Cr 16.3%, Ti 21.2%, balance Ni; or Cr 17.2%, Ti 20.9%, balance Ni. These particular braze alloy compositions exhibit a solidus temperature of about 1,205° C. and a liquidus temperature of about 1,215° C., and thus a melting temperature range of only 10° C. As such, they may be particularly useful when brazing to Alloy 247 or Rene 80. Another braze alloy within this group has the following composition: Cr 20%, Ti 20%, Ni 60%.

Other braze alloys may have compositions within the following ranges:

Cr 12-16%;
Ti 13-16%;
Al 0-2.5%;
Co 2-4%;
W 3-5%;
Mo 0-2%;
Ta 0-2%;
balance Ni.

A particular braze alloy within this group may have the following composition: Cr 14.1%, Ti 14%, Al 2.1%, Co 3.1%, W 4.1%, Mo 1%, Ta 1%, balance Ni. This particular braze alloy composition may be particularly useful when brazing to Alloy 247.

Other braze alloys may have compositions within the following ranges:

Cr 15-18%;
Ti 10-15%;
Al 0-2.5%;
Co 2-4%;
W 3-5%;
Mo 0-2%;
Ta 0-2%;
balance Ni.

A particular braze alloy within this group may have the following composition: Cr 17.57%, Ti 13.54%, Al 2.39%, Co 3.24%, W 3.47%, Mo 1.15%, Ta 0.83%, balance Ni. This particular braze alloy composition exhibits a solidus temperature of about 1,205° C. and a liquidus temperature of about 1,220° C., and thus a melting temperature range of only 15° C. As such, it may be particularly useful when brazing to Alloy 247 or Rene 80.

Other braze alloys may have compositions within the following ranges:

Cr 15-19%;
Ti 8-10%;
Al 0-2.5%;
Co 14-18%;
Mo 12-16%;
balance Ni.

A particular braze alloy within this group may have the following composition: Cr 15.12%, Ti 10%, Al 2.12%, Co 15.8%, Mo 12.97%, balance Ni. This particular braze alloy composition exhibits a solidus temperature of about 1,205° C. and a liquidus temperature of about 1,223° C., and thus a melting temperature range of only 18° C. As such, it may be particularly useful when brazing to Alloy 247 or IN 939.

A typical solution heat treatment effective to homogenize a braze joint of such alloys may be:

heat the assembly to 1,472° F. (800° C.) at 15-30° F. (8.3-16.6° C.) per minute;
hold at 1,472° F. for 20 minutes;
heat to 2,125° F. (1,163° C.) at 15-30° F. per minute;
hold at 2,125° F. for 20 minutes;
heat to 2,192-2,282° F. (1,200-1,250° C.) at 1-30° F. (0.6-16.6° C.) per minute;
hold at 2,192-2,282° F. for 2-12 hours;
furnace cool to 2,120-2,192° F. (1,160-1,200° C.);
hold at 2,120-2,192° F. up to 20 minutes;
argon cool to room temperature.

A repair process utilizing the alloys described above is illustrated in FIG. 1 where a gas turbine engine vane 10 formed of a superalloy substrate material 12 has a service-induced discontinuity 14 extending into the substrate material 12 from its surface 16. In this embodiment, the discontinuity 14 is illustrated as a large gap crack having an opening of greater than 0.001 inches at surface 16. After being cleaned using any known process, crack 14 is filled with an alloy-containing powder 18, such as one containing a mixture of superalloy particles 20 and braze material particles 22. The braze particles 22 in the alloy-containing powder 18 may constitute 5-50% by weight of the powder 18. In other embodiments the alloy-containing powder 18 may be only superalloy particles 20. The mesh size range of the braze material particles 22 is preferably smaller (for example −325 mesh/+2 micron) than the superalloy particles 20 (for example −120 mesh/+2 micron) in order to provide enhanced filling of the discontinuity 14. A layer of the braze material particles 22 is disposed above the alloy-containing powder 18 to ensure a complete fill of the discontinuity during the brazing process. During a solution heat treatment of the substrate material 12, the braze material particles 22 melt and fill the discontinuity while the superalloy particles 20 sinter together. The titanium or other element contained in the braze material at a higher concentration than in the base superalloy then distributes into the surrounding superalloy material to achieve a solid homogenous joint. Advantageously, the braze material 22 contains no element that is not contained in the substrate 12 to be brazed so that no new element is introduced into the superalloy material, and the composition of the homogenized joint material is very similar to the substrate material 12, thus providing a structural joint. The very narrow melting temperature range of the braze material and subsequently reduced liquidity time also limits the erosion of the substrate material 12 during the brazing operation.

Figure 2:
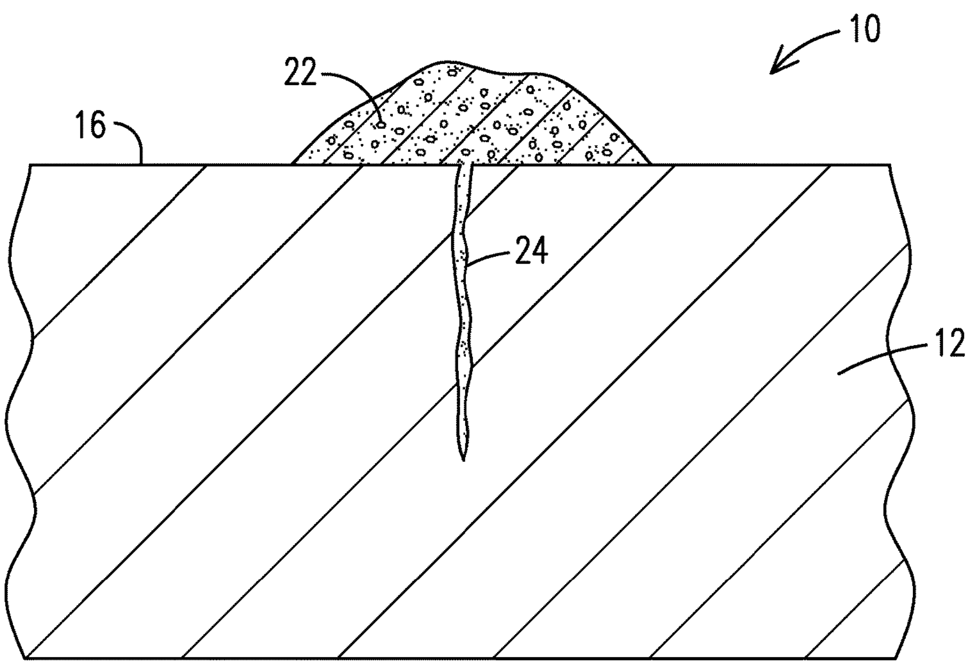
FIG. 2 is a side section view of a gas turbine vane wherein a narrow gap discontinuity being repaired by brazing.

FIG. 2 illustrates a different region of the substrate material 12 wherein a narrow gap discontinuity 24 (less than 0.001 inches) is repaired using only braze material particles 22. Since the width of the discontinuity 24 is limited, there is no need for filling the discontinuity with superalloy particles 20 as in FIG. 1, as the braze material 22 will flow into and fill the discontinuity during the solution heat treatment.

In other embodiments the braze alloys disclosed herein may be formed as a foil or a wire and may be applied with any known process. Repair of a superalloy material surface containing a plurality of discontinuities may be accomplished by optionally filling the discontinuities with superalloy particles (as desired for wider openings), then conducting a heat treatment of the superalloy with a foil of one of the disclosed titanium-based braze alloys disposed over the surface, causing the braze material to melt, to flow into the discontinuities and to fill around the superalloy particles, then to homogenize and to solidify as the melting temperature element diffuses into the substrate 12.

While various embodiments of the present invention have been shown and described herein, it will be obvious that such embodiments are provided by way of example only. Numerous variations, changes and substitutions may be made without departing from the invention herein.

The invention claimed is:

1. A method comprising:

applying a boron and silicon free braze alloy to a superalloy substrate, the braze alloy consisting only of elemental constituents that are present in the superalloy substrate, the braze alloy composition containing an effective quantity of titanium as a melting point depressant so that the braze alloy composition has a melting temperature range of no more than 50° C. and inclusive of or below a solution heat treating temperature of the superalloy substrate; and performing a solution heat treatment of the superalloy substrate effective to melt the braze alloy and to fuse and homogenize a braze joint, applying the braze alloy composition consisting of:

Cr 12-16 wt. %;
Ti 13-16 wt. %;
Al 0-2.5 wt. %;
Co 2-4 wt. %;
W 3-5 wt. %;
Mo 0-2 wt. %;
Ta 0-2 wt. %;
balance Ni, wherein the braze alloy composition is free of hafnium.

2. The method of claim 1, further comprising applying the braze alloy as a powder into a discontinuity on a surface of the superalloy substrate so that the braze joint fills the discontinuity.

3. The method of claim 2, further comprising applying a superalloy powder material into the discontinuity with the braze alloy.

4. The method of claim 3, further comprising selecting a mesh size range of the braze alloy powder to be smaller than a mesh size range of the superally powder material.

5. A method comprising:

applying a boron and silicon free braze alloy to a superalloy substrate, the braze alloy consisting only of elemental constituents that are present in the superalloy substrate, the braze alloy composition containing an effective quantity of titanium as a melting point depressant so that the braze alloy composition has a melting temperature range of no more than 50° C. and inclusive of or below a solution heat treating temperature of the superalloy substrate; and performing a solution heat treatment of the superalloy substrate effective to melt the braze alloy and to fuse and homogenize a braze joint, applying the braze alloy composition consisting of:

Cr 15-18 wt. %;
Ti 10-15 wt. %;
Al 0-2.5 wt. %;
Co 2-4 wt. %;
W 3-5 wt. %;
Mo 0-2 wt. %;
Ta 0-2 wt. %;
balance Ni.

6. The method of claim 5, further comprising selecting the braze alloy composition to have a melting temperature range of 15° C., and selecting the superalloy substrate to be Alloy 247 or Rene 80.

7. A method comprising:

applying a boron and silicon free braze alloy to a superalloy substrate, the braze alloy consisting only of elemental constituents that are present in the superalloy substrate, the braze alloy composition containing an effective quantity of titanium as a melting point depressant so that the braze alloy composition has a melting temperature range of no more than 50° C. and inclusive of or below a solution heat treating temperature of the superalloy substrate; and performing a solution heat treatment of the superalloy substrate effective to melt the braze alloy and to fuse and homogenize a braze joint applying the braze alloy composition consisting of:

Cr 15-19 wt. %;
Ti 8-10 wt. %;
Al 0-2.5 wt. %;
Co 14-18 wt. %;
Mo 12-16 wt. %;
balance Ni.

8. A method comprising:

removing a superalloy gas turbine component from service;

applying a boron and silicon free braze alloy to a discontinuity on a surface of the component, the braze alloy consisting only of elemental constituents that are present in the component, the braze alloy containing an effective quantity of titanium as a melting point depressant so that the braze alloy composition has a melting temperature range of no more than 20° C.; and heat treating the component with a temperature regiment effective to melt the braze alloy and to fuse and to homogenize a braze joint to repair the discontinuity, applying the braze alloy composition consisting of:

Cr 15-18 wt. %;
Ti 10-16 wt. %;
Al 0-2.5 wt. %;
Co 2-4 wt. %;
W 3-5 wt. %;
Mo 0-2 wt. %;
Ta 0-2 wt. %;
balance Ni, wherein the braze alloy composition is free of hafnium.

9. The method of claim 8, further comprising selecting the braze alloy to have a melting temperature range of no more than 15° C.

10. The method of claim 8, wherein the component comprises Rene 80 or Alloy 247 superalloy material, and further comprising selecting the braze alloy to have a liquidus temperature of no more than 1,215° C. and having a melting temperature range of no more than 20° C.

11. The method of claim 8, further comprising cleaning a surface of the component proximate the discontinuity prior to the step of applying the braze alloy.

* * * * *